UNITED STATES PATENT OFFICE.

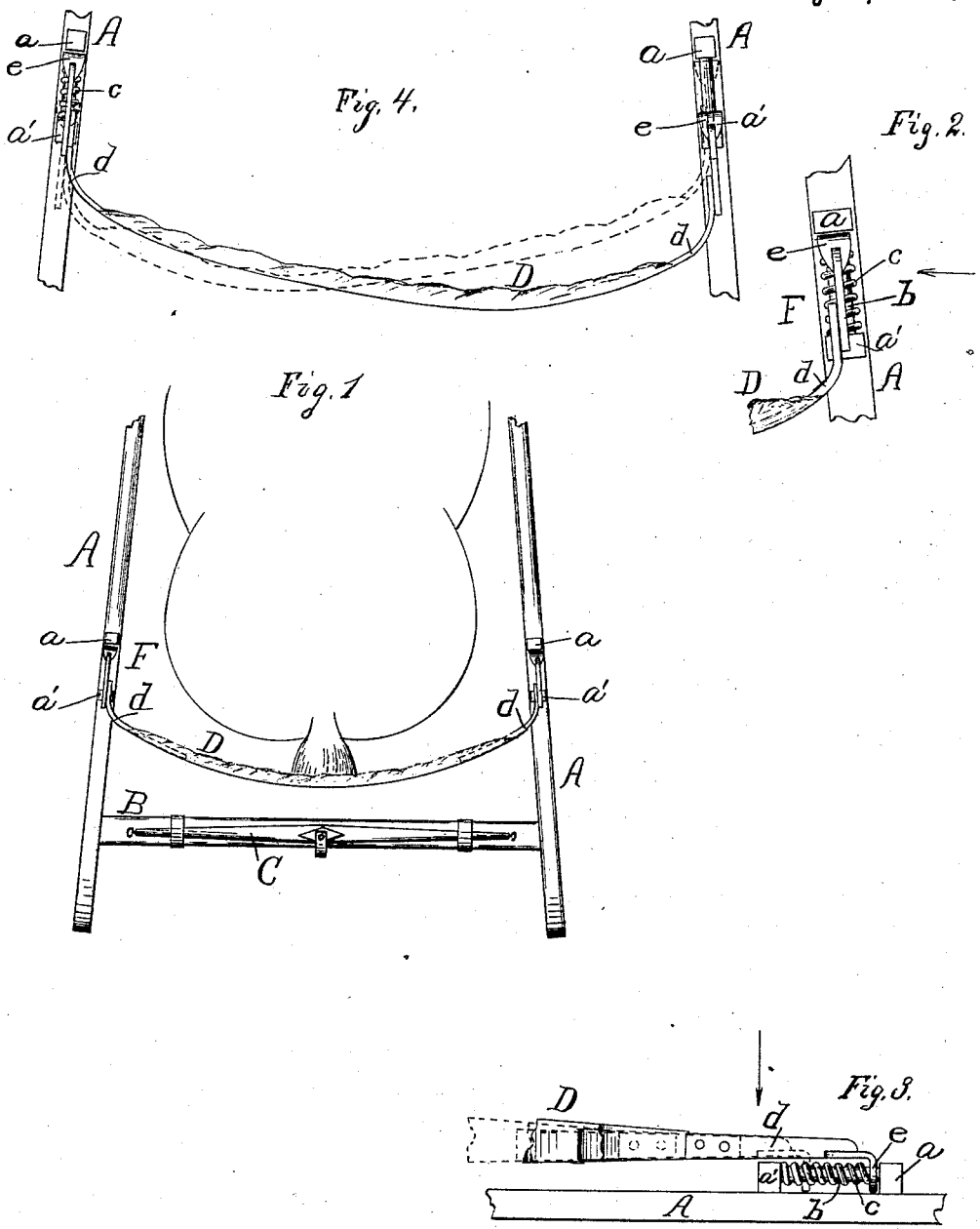

CHARLES PULVER, OF ROCHESTER, NEW YORK.

HOLDBACK FOR VEHICLES.

SPECIFICATION forming part of Letters Patent No. 341,052, dated May 4, 1886.

Application filed December 5, 1885. Serial No. 184,853. (No model.)

*To all whom it may concern:*

Be it known that I, CHARLES PULVER, of Rochester, in the county of Monroe and State of New York, have invented a new and useful Improvement in Holdbacks for Vehicles, which improvement is fully set forth in the following specification and shown in the accompanying drawings.

The object of my invention is to produce an improved holdback device for a horse attached to the thills of a vehicle, said holdback being not a part of the harness, but a permanent attachment to the shafts, and remaining with the latter when the horse is detached therefrom, the invention being hereinbelow fully described, and more particularly pointed out in the claims.

Referring to the drawings, Figure 1 shows my improved holdback attached to the thills of a vehicle, the view being taken as from a point overhead; Fig. 2, a portion of a thill and one end of the holdback connected therewith, viewed in the same direction in which Fig. 1 is seen, drawn to a larger scale to better show the connection between said holdback and thill; Fig. 3, a view of the same parts seen as indicated by arrow in Fig. 2, drawn to further show the manner of connecting the holdback with the thill; and Fig. 4, a view of the holdback and connected parts, seen from the direction in which Fig. 1 is seen, drawn to show the operation of said holdback when pressing against the horse in the act of stopping the motion of the vehicle or going down a hill.

Referring to the parts, A are the thills of a wagon or vehicle of common kind, and B the cross-bar of the thills, supporting the whiffletree C.

D is my improved holdback, its respective ends being secured to the shafts, as shown. Each shaft is provided with two similar rigid holders, F, for the holdback, consisting of rods $b$, held to the respective shafts by means of studs $a$, firmly fixed in the shafts. Around these rods are placed stiff spiral springs $c$. The holdback D is formed of two shank-irons or bent iron pieces, $d$, which are formed with downturned loops or eyes $e$ at one end of each, pierced with holes in which to receive said rods, respectively, said loops being between the forward studs or holders $a$ and the adjacent ends of the springs, so that a backward pull or pressure upon the shank-irons $d$ will tend to compress the springs between said loops $e$ and the rear studs, $a'$. The ends of the irons $d$ opposite the ends attached to the holders F are turned toward each other, made wider and thinner, and joined by strong leather, covered and padded on the side next the horse. In pressing back against the holdback the power of the horse is exerted to compress the springs, on account of which the action of the horse upon the vehicle is not abrupt and violent, but easy and gradual, on account of the action of the springs.

In descending a hill, when the vehicle presses the holdback against the horse, he, in the act of walking, presses the pad of the holdback alternately upon one side and the other of the middle thereof, changing the holdback alternately into the two shapes shown in Fig. 4. From this action of the horse the springs at either end of the holdback yield alternately as the pressure is thrown from one side to the other, as stated, on account of the holdback being pressed against the horse's thighs.

By the use of this style of holdback the breeching and holdback-straps of the harness as usually made may be dispensed with; also the saddle, back-strap, and belly-band, the breast-strap and forward ends of the thills being supported by the usual light neck-strap. The harness for the horse in this case consists only of the breast-strap and traces, which are joined as one piece—the neck-strap, bridle, and reins. If the horse is to be checked up, check-reins, with a light back-strap and crupper, may be added.

It is well understood that a horse, like a man, is capable of doing better physical work when the muscles are the least hampered and restrained in action with harness and similar furniture. Much of the harness of a horse when hitched to a vehicle is made necessary for doing the holdback work, all of which is dispensed with by the use of my improved holdback device, herein described and shown.

What I claim as my invention is—

1. The thills of a vehicle, each provided with a horizontal rod, $b$, resting in holders $a\ a'$, secured to the thills and provided with a spring, c, for the rod, in combination with a breech-pad, D, formed with loops e, joined to said respective rods, substantially as shown and set forth.

2. The thills of a vehicle, each provided with a horizontal rod, b, resting in holders a a', secured to said thills and provided with a spring for the rod, in combination with a breech-pad having shank-irons d, formed with loops e, joined to said respective rods, and united by leather strap or padding, substantially as described.

CHARLES PULVER.

Witnesses:
E. B. WHITMORE,
H. B. KNIGHT.